E. B. ROSE.
UNLOADING ATTACHMENT FOR SWEEP RAKES.
APPLICATION FILED FEB. 16, 1917.
1,252,723.
Patented Jan. 8, 1918.
2 SHEETS—SHEET 2.
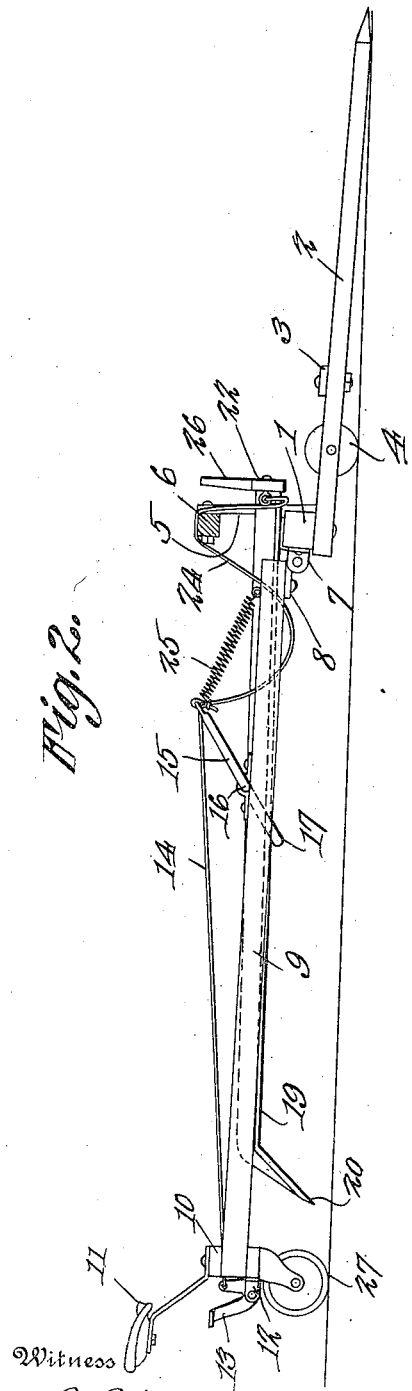
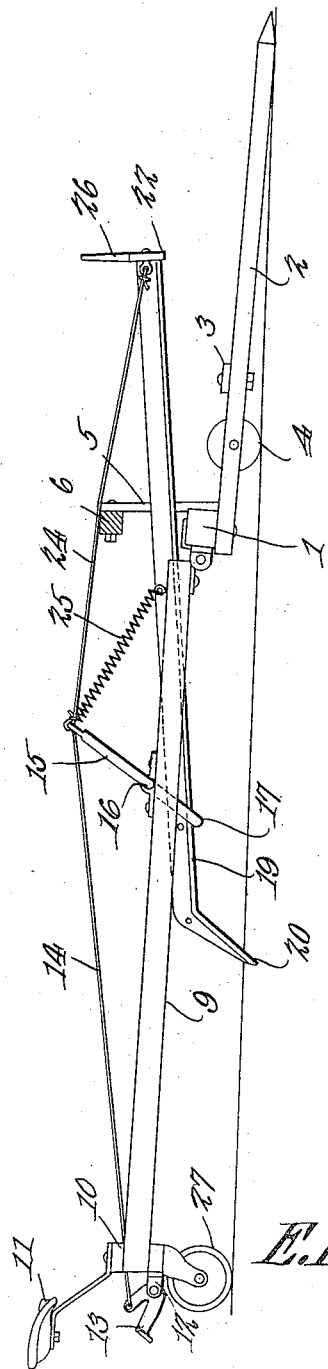
E. B. Rose
Inventor

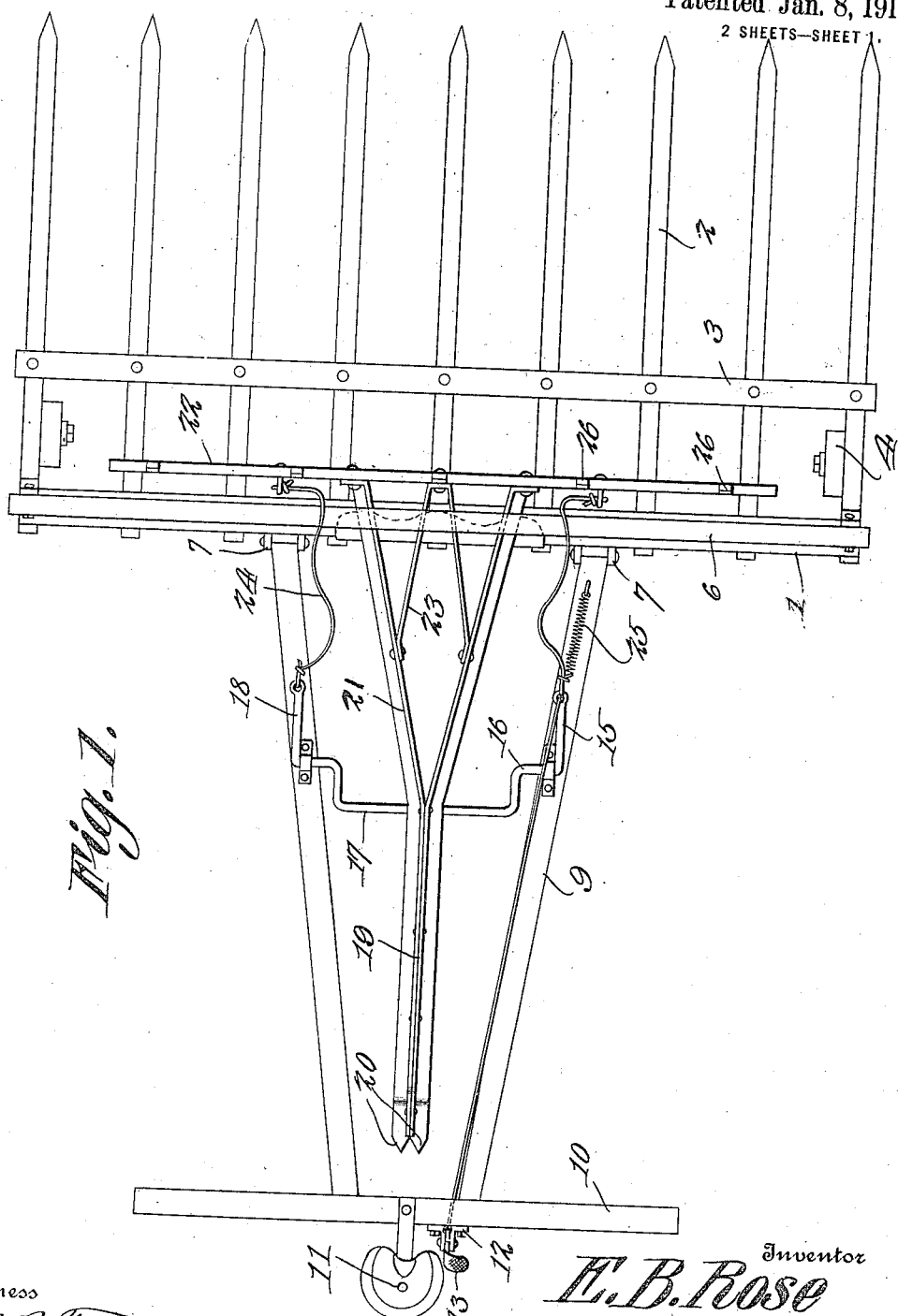

UNITED STATES PATENT OFFICE.

ELIAS BERSON ROSE, OF BOZEMAN, MONTANA.

UNLOADING ATTACHMENT FOR SWEEP-RAKES.

1,252,723.        Specification of Letters Patent.        Patented Jan. 8, 1918.

Application filed February 16, 1917.   Serial No. 149,040.

*To all whom it may concern:*

Be it known that I, ELIAS B. ROSE, a citizen of the United States, residing at Bozeman, in the county of Gallatin and State of Montana, have invented a new and useful Unloading Attachment for Sweep-Rakes, of which the following is a specification.

This invention relates to an unloading attachment for sweep rakes, whereby the load carried by a rake can be pushed off of the teeth of the rake when said rake is backed away from the stacker to which the hay or other material is to be delivered.

Heretofore it has been necessary, after delivering the hay to a stacker and pulling the sweep rake away from the stacker, to use the rake as a means for shoving back onto the stacker material which drags away therefrom with the sweep rake. This has resulted in the loss of considerable time. One of the objects of the present invention is to provide means whereby the hay in one operation can be delivered to the stacker and its does not become necessary to waste time in repeatedly pushing portions of the load back onto the stacker.

A further object is to provide simple and efficient means for controlling the action of the attachment.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of a sweep rake having the present improvements combined therewith, the attachment being shown in its normal or set position.

Fig. 2 is a side elevation of the structure with the parts in the positions shown in Fig. 1, the upper portion of the head of the sweep rake being shown in section.

Fig. 3 is a view similar to Fig. 2 but showing the attachment projected to deliver the load from the rake.

Referring to the figures by characters of reference 1 designates the lower cross beam of the head of the sweep rake and from which extend the teeth or tines 2 which may be connected by a cross bar 3 and are preferably supported by wheels 4 designed to rest on the ground. Standards 5 project upwardly from the beam 1 and support a top beam 6 forming the upper portion of the head of the sweep rake.

Brackets 7 are extended rearwardly from the beam 1 and hingedly connected thereto are the brackets 8 secured to the forward ends of forwardly diverging beams 9. These beams are connected together at their rear ends by a cross beam 10 to which the draft animals are adapted to be fastened in any suitable manner. This beam may also support the seat 11 to be occupied by the driver. A bracket 12 is secured to the beam and close to the seat and fulcrumed in this bracket is a foot lever 13 which can be easily reached by the driver. This foot lever is in the form of a bell crank and one of the arms thereof is connected by a cable 14 to an arm 15 extending radially from one end of a transverse shaft 16 journaled on the diverging beams 9. This shaft has a crank portion 17 and is not only provided with the radial arm 15 at one end thereof but also with another radial arm 18 at its other end and which corresponds with the arm 15.

A thrust beam 19 of any preferred construction normally rests on the crank portion 17 of shaft 16 and the rear end of this thrust beam is bent downwardly and pointed to form spaced prongs 20. The forward portion of the beam is split and bent to V-shape as shown at 21 and is attached to a push bar 22 supported by said beam in front of the head of the sweep rake. Braces 23 may connect the middle portion of this push bar to the V-shaped portion 21 of the beam. The arms 15 and 18 are connected to the push bar 22 by cable 24 which are normally slack as shown in Figs. 1 and 2. A spring 25 is preferably attached to the arm 15 and to one of the beams 9 and serves to hold the crank portion 17 of shaft 16 normally elevated, thereby to support the prongs 20 out of contact with the ground, as shown in Fig. 2. Fingers 26 are extended upwardly from the push bar 22. A supporting caster 27 is attached to the beam 10.

It will be apparent that when the sweep rake is drawn forward, the front ends of the tines or prongs 2 will ride along the ground as shown in Fig. 1. The hay in the path of the sweep rake will be gathered onto the tines or fingers and will pile up thereon, pressing backwardly against the fingers 26 and the push bar 22. The sweep rake is then driven up to the stacker so as to overlie the teeth of the stacker and when the load has thus been brought to position directly over the teeth of the stacker, the operator presses downwardly on the foot lever 13 so as to cause said lever to pull through cable 14 on the arm 15. Spring 25 will thus be placed under increased tension and the crank portion 17 of the shaft 16 will swing downwardly and allow the prongs 20 to bite into the ground. While the parts are thus held the sweep rake is backed away from the stacker with the result that while the prongs or tines 2 will withdraw from under the load on the rake, the push bar 22 and its fingers 26 will remain practically stationary, thus insuring the holding of the load while the prongs or tines 2 are being withdrawn from under it. Consequently the entire load will be deposited on the stacker in one operation. As soon as the sweep rake has been backed a sufficient distance to take up all of the slack in the cables 24, said cables will pull on the arms 15 and cause the crank portion 17 of shaft 16 to swing upwardly, thereby lifting the rear end of the beam 19 and causing the prongs 20 to become disengaged from the ground. The spring 25 will hold the parts in these positions and when the driver starts to collect another load it is only necessary for him to press down on foot lever 13 to bring the push bar 22 back to position as the weight of the prongs 20 dragging on the ground will bring it back. The sweep rake is subsequently pushed forwardly for the purpose of collecting hay or the like, the load passing onto the prongs or tines 2 will push against the bar 22 and its fingers 26 and reset said bar so that it will arrive in the position shown in Fig. 2. The operation heretofore described can then be repeated.

What is claimed is:—

1. The combination with a sweep rake having a head at the back end of the tines thereof, of a beam slidably mounted on the head, a push bar at the front end of the beam, ground engaging prongs at the rear end of the beam, a crank extending under the beam, yielding means for holding the crank normally elevated to support the prongs out of engagement with the ground, means under the control of the driver for shifting the crank to lower the prongs in engagement with the ground, and means operated by the relative movement of the push bar and the rake during the unloading of the rake, for shifting the crank to disengage the prongs from the ground.

2. The combination with a sweep rake including connected tines, a head at the back ends thereof, beams hingedly connected to the head, and supporting wheels attached to the beams and to certain of the tines, of a crank shaft, a radial arm thereon, a beam supported by the crank shaft and having ground engaging prongs at one end, a push bar at the other end of the beam, yielding means for holding the crank normally in position to support the prongs out of contact with the ground, means under the control of a driver for rotating the shaft to shift the crank and lower the prongs into contact with the ground, and means operated by the relative movement of the rake and push bar during the unloading of the rake, for rotating the crank shaft and elevating the prongs out of contact with the ground.

In testimony that I claim the foregoing as my own, I have hereto affixed my signature in the presence of two witnesses.

ELIAS BERSON ROSE.

Witnesses:
  JOHN H. PAXTON,
  LUELLA SUMMERS.

Copies of this patent may be obtained for five cents each, by addressing the "Commissioner of Patents, Washington, D. C."